3,242,498
CARBAMYL PHOSPHATES
Donald G. Stoffey, 507½ Richmond St., El Cerrito, Calif.;
Richard C. Maxwell, 1504 Clifford St., Pullman, Wash.;
Arnold D. Gutman, 335 Alcatraz Ave., Oakland, Calif.;
Llewellyn W. Fancher, 1662 Foothill Park Circle,
Lafayette, Calif.; and James T. Hallett, 20701 St.
Charles St., Saratoga, Calif.
No Drawing. Filed Nov. 6, 1962, Ser. No. 235,831
7 Claims. (Cl. 260—938)

This invention relates to certain novel chemical compounds and to the use of such compounds as insecticides and acaricides. The compounds are particularly valuable for their systemic and miticidal properties. More specifically the invention relates to compounds of the formula:

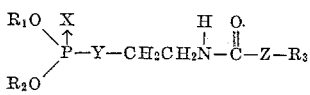

wherein $R_1$ and $R_2$ are lower alkyl radicals, $R_3$ is selected from lower alkyl and lower chloroalkyl, X and Y are selected from oxygen and sulfur, at least one being sulfur, and Z is oxygen or sulfur.

The compounds of the present invention can be made in accordance with the following illustrative examples: (Code numbers have been assigned to each compound and are used hereinafter for convenience).

*Example 1*

R–3422—Ethyl - N - 2(O,O-dimethylphosphorodithionyl) ethylcarbamate. Ethyl-N-2-chloroethylcarbamate was made by reacting aminoethanol with ethylchloroformate and then replacing the hydroxyl group with chlorine by means of thionyl-chloride. A quantity (7.6 g.) of ethyl-N-2-chloroethylcarbamate and 11 g. of sodium O,O-dimethylphosphorodithioate were refluxed in 150 ml. of toluene for four hours. After cooling, the toluene solution was washed with water three times. The solvent was removed by means of a rotary evaporator at a pressure of a few mm. of mercury. The product weighed 7.5 g. (53% yield), $N_D30$ 1.4695.

*Example 2*

R–3423—Ethyl - N - 2-(O,O-diethylphosphorodithionyl) ethylcarbamate. In essentially the same manner as Example 1, 7.6 g. of ethyl-N-2-chloroethyl carbamate was reacted with 12 g. of sodium O,O-diethylphosphorodithioate to give 11.6 g. (77% yield) of a dark amber liquid, $N_D30$ 1.4962.

*Example 3*

R–3424—Ethyl - N-2-(O,O-diethylphosphorothionyl) ethylcarbamate. In essentially the same manner as Example 1, 7.6 g. of ethyl-N-2-chloroethylcarbamate and 12 g. of sodium O,O-diethylphosphorothioate were reacted to give 7 g. (49% yield) of the amber liquid, $N_D30$ 1.4547.

*Example 4*

R–3519—2 - chloroethyl-N-2-(O,O-dimethylphosphorodithionyl) ethylcarbamate. In essentially the same manner as Example 1, 11 g. of 2-chloroethyl-N-2-bromoethylcarbamate, made by reacting 2-chloroethylchloroformate with aminoethanol and replacing the hydroxy group with bromide by the means of phosphorus tribromide, and 12 g. of sodium O,O-dimethylphosphorodithioate were reacted to give 11 g. (71% yield) of the nearly water-white liquid, $N_D30$ 1.5164.

*Example 5*

R–3520—2 - chloroethyl-N-2-(O,O-diethylphosphorodithionyl) ethylcarbamate. In essentially the same manner as Example 1, 11 g. of chloroethyl-N-2-bromoethylcarbamate was reacted with 13 g. of sodium O,O-diethylphosphorodithioate to give 14 g. (83% yield) of the water-white liquid, $N_D30$ 1.5123.

*Example 6*

R–3521—2 - chloroethyl-N-2-(O,O-diethylphosphorothionyl) ethylcarbamate. In essentially the same manner as Example 1, 11 g. of 2-chloroethyl-N-2-bromoethyl carbamate was reacted with 13 g. of sodium O,O-diethylphosphorothioate to give 11 g. (69% yield) of the amber liquid, $N_D30$ 1.4790.

*Example 7*

R–5992—N - β - O,O-diethyldithiophosphorylethyl-S-ethylthiolcarbamate. This compound was made by refluxing and stirring 12.8 g. of N-β-bromoethyl-S-ethylthiolcarbamate and 20.2 g. potassium O,O-diethylphosphorodithioate in 100 cc. of methyl ethyl ketone for two hours. The ketone solvent was then evaporated on a steam bath with air. The residue was then taken up in chloroform, washed 3 times with water, dried over magnesium sulfate, filtered, and the solvent removed on a steam bath with air. The product weighed 16.0 g. (84% yield), $N_D30$ 1.4695.

*Example 8*

R–5994—N - β - O,O-diethyldithiophosphorylethyl-S-methylthiolcarbamate. This compound was made by refluxing and stirring 15.8 g. N-β-bromoethyl-S-methylthiolcarbamate and 24.6 g. potassium O,O-diethylphosphorodithioate in 100 cc. methyl ethyl ketone for two hours. The ketone solvent was then evaporated on a steam bath with air. The residue was then taken up in chloroform, washed 3 times with water, dried over magnesium sulfate, filtered, and the solvent removed on a steam bath with air. The product weighed 19.5 g. (81% yield), $N_D30$ 1.5443.

*Example 9*

R–5996—N-β-O,O - diethyldithiophosphoryl ethyl-S-n-propylthiolcarbamate. This compound was made by refluxing and stirring 18.1 g. N-β-bromoethyl-S-n-propylthiolcarbamate and 24.6 g. potassium O,O-diethylphosphorodithioate in 100 cc. of methyl ethyl ketone for 2½ hours. The ketone solvent was then evaporated on a steam bath with air. The residue was then taken up in chloroform, washed 3 times with water, dried over magnesium sulfate, filtered, and the solvent removed on a steam bath with air. The product weighed 19.4 g. (73.5% yield), $N_D30$ 1.5368.

*Example 10*

R–5998—N-β-O,O-diethyldithiophosphoryl - ethyl - S-isopropylthiolcarbamate. This compound was made by refluxing and stirring 18.1 g. N-β-bromoethyl-S-isopropylthiolcarbamate and 24.6 g. potassium O,O-diethylphosphorodithioate in 125 cc. methyl ethyl ketone for 2½ hours. The ketone solvent was then evaporated on a steam bath with air. The residue was then taken up with chloroform, washed 3 times with water, dried over magnesium sulfate, filtered, and the solvent removed on a steam bath with air. The product weighed 21.0 g. (79.5% yield), $N_D30$ 1.5330.

The compounds have been tested as insecticides and as acaricides according to the following methods:

*Acaricidal evaluation test.*—The two-spotted mite, *Tetranychus telarius* (Linn.) is employed in tests for acaricides. Young Pinto bean plants are infested with several hundred mites. Dispersions of test compounds are prepared by dissolving half a gram of the toxic material in ten milliliters acetone. This solution is then diluted with water containing 0.015% Vatsol (a sulfonate type wetting agent) and 0.005% Methocel (methyl cellulose) as emulsifiers, the amount of water being sufficient to give concentrations of active ingredient ranging from 0.25% to 0.005%. The test suspensions are then sprayed on the infested Pinto bean plants. After seven and fourteen days, the plants are examined both for post-embryonic forms of the mite as well as eggs. The precentage of kill is determined by comparison with control plants which have not been sprayed and the LD–50 value calculated using well-known procedures. LD–50 values are reported under the columns "2 SM" in the table; "PE" indicates the post-embryonic forms while "E" indicates eggs.

*Systemic toxicity evaluation against two-spotted mites.*—Pinto bean plants are placed in bottles containing 200 ml. of the test solutions and held in place with cotton plugs. Only the roots are immersed. The solutions are prepared by dissolving the test compounds in acetone and then diluting with distilled water. The final acetone concentration of the solutions is never allowed to exceed 1.0%. As soon as the plants have been placed in the solutions they are infested with two-spotted mites, *Tetranychus telarius*. The results are reported in the table under "2 SM Systemic."

After seven and fourteeen days the plants are examined both for post-embryonic forms of the mite as well as eggs. The percentage of kill is determined by comparison with control plants which have been placed in distilled water only. Again, the LD–50 value is calculated and reported under the columns "2 SM Systemic" in the table.

*Insecticidal evaluation tests.*—Four insect species are subjected to evaluation tests for insecticides:

(1) American cockroach (Roach) *Periplaneta americana* (Linn.)

(2) Large milkweed bug (MWB) *Oncopeltus fasciatus* (Dallas)

(3) Confused flour beetle (CFB) *Tribolium confusum* (Duval)

(4) Housefly (HF) *Musca domestica* (Linn)

The procedure for the insects is similar to the miticidal testing procedure. Test insects are caged in cardboard mailing tubes 3⅛″ in diameter and 2⅝″ tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound at various concentrations. After twenty-four and seventy-two hours, counts are made to determine living and dead insects.

Housefly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and seventy-two hours, counts are made to determine living and dead insects. The LD–50 values are calculated using well-known procedures.

| Code | HF (μg.) | Roach (percent) | MWB (percent) | CFB (percent) | 2SM PE (percent) | 2SM E (percent) | 2SM Systemic (p.p.m.) |
|---|---|---|---|---|---|---|---|
| R–3422 | >100 | >0.1 | >0.1 | 0.1 | 0.01 | 0.03 | 1 |
| R–3423 | 100 | 0.1 | >0.1 | 0.1 | <0.01 | <0.01 | <10>1 |
| R–3424 | ¹0.1 | >0.1 | >0.1 | >0.1 | 0.06 | 0.12 | >10 |
| R–3519 | >100 | >0.1 | >0.1 | 0.1 | 0.03 | 0.03 | 5 |
| R–3520 | >100 | >0.1 | >0.1 | >0.1 | 0.005 | 0.005 | <10>1 |
| R–3521 | >100 | >0.1 | >0.1 | >0.1 | 0.01 | 0.01 | 5 |
| R–5992 | >100 | | | | 0.003 | 0.008 | |
| R–5994 | 75 | | | | 0.008 | 0.1 | |
| R–5996 | | | | | 0.0008 | 0.003 | |
| R–5998 | ¹0.1 | | | | 0.003 | 0.01 | |

¹ Percent.

The compounds of the present invention may be applied to a pest habitat in the ways well known to those skilled in the art such as dusts, sprays of solutions or dispersions and the like.

We claim:

1. A compound of the formula

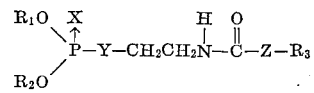

wherein $R_1$ and $R_2$ are lower alkyl radicals, $R_3$ is selected from the group consisting of lower alkyl and lower chloroalkyl and X, Y and Z are selected from the group consisting of oxygen and sulfur, at least one of the groups X and Y being sulfur.

2. The compound ethyl-N-2-(O,O-dimethylphosphorodithionyl) ethylcarbamate.

3. The compound ethyl-N-2-(O,O-diethylphosphorodithionyl) ethylcarbamate.

4. The compound ethyl-N-2-(O,O-diethylphosphorothionyl) ethylcarbamate.

5. The compound 2-chloroethyl-N-2-(O,O-dimethylphosphorodithionyl) ethylcarbamate.

6. The compound 2-chloroethyl-N-2-(O,O-diethylphosphorodithionyl) ethylcarbamate.

7. The compound 2 - chloroethyl-N-2-(O,O-diethylphosphorothionyl) ethylcarbamate.

References Cited by the Examiner

UNITED STATES PATENTS

| | | | |
|---|---|---|---|
| 2,630,451 | 3/1953 | Fletcher et al. | 260—461 |
| 2,743,235 | 4/1956 | McDermott | 260—461 |
| 2,864,849 | 12/1958 | Schrader | 260—461 |
| 2,890,947 | 6/1959 | Annable et al. | 260—461 |
| 3,085,043 | 4/1963 | Beaver et al. | 167—22 |
| 3,085,929 | 4/1963 | Haslam | 167—22 |

OTHER REFERENCES

Mel'Nikov, "Chem. Abst.," vol. 52, column 393—395 (January 10, 1958).

CHARLES B. PARKER, *Primary Examiner.*

JULIAN S. LEVITT, *Examiner.*